May 7, 1968

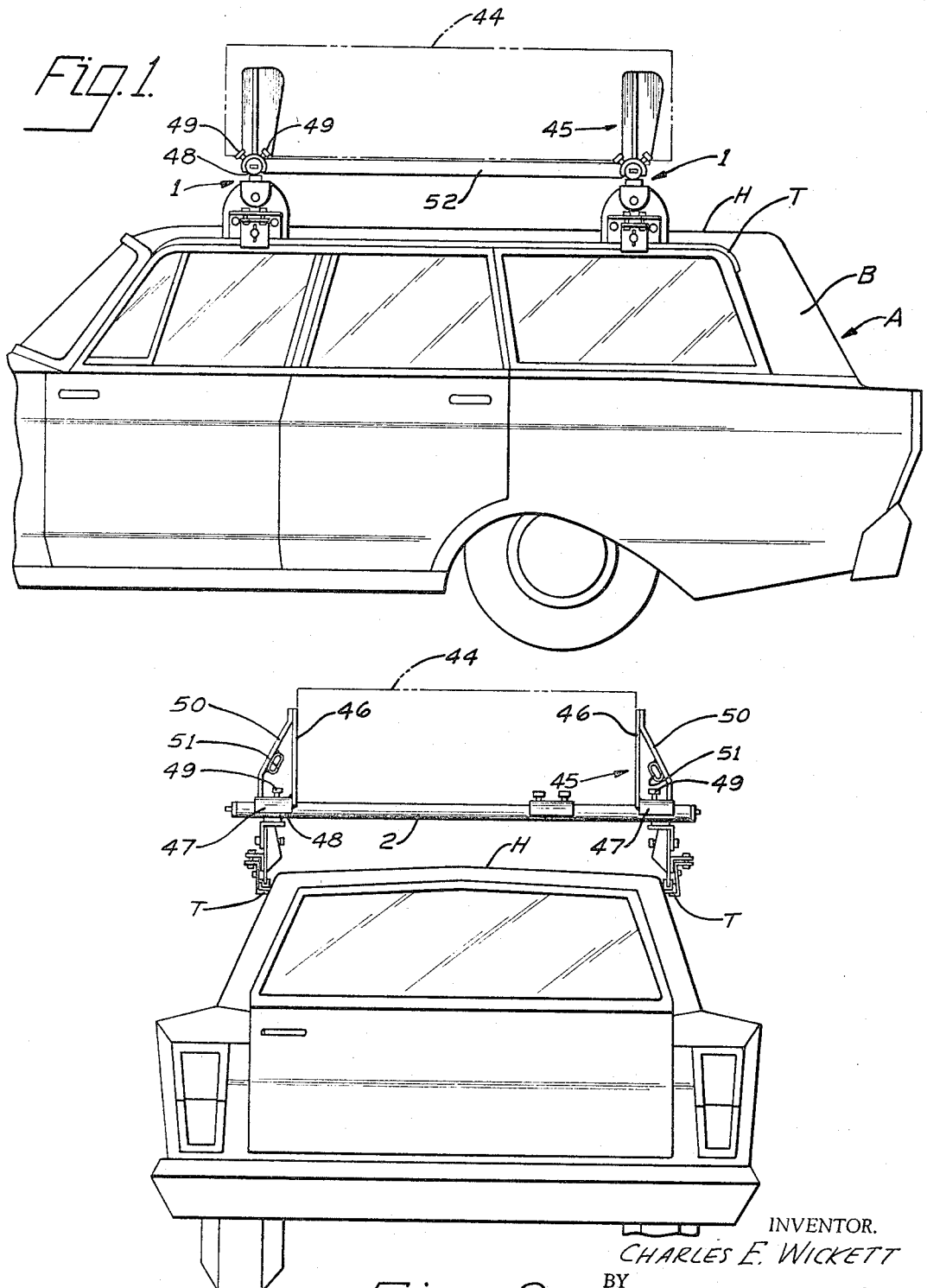

C. E. WICKETT 3,381,866

DETACHABLE LUGGAGE RACK

Filed Dec. 1, 1966

INVENTOR.
CHARLES E. WICKETT
BY
John H. Leonard,
his ATTORNEY.

May 7, 1968  C. E. WICKETT  3,381,866
DETACHABLE LUGGAGE RACK
Filed Dec. 1, 1966  3 Sheets-Sheet 3
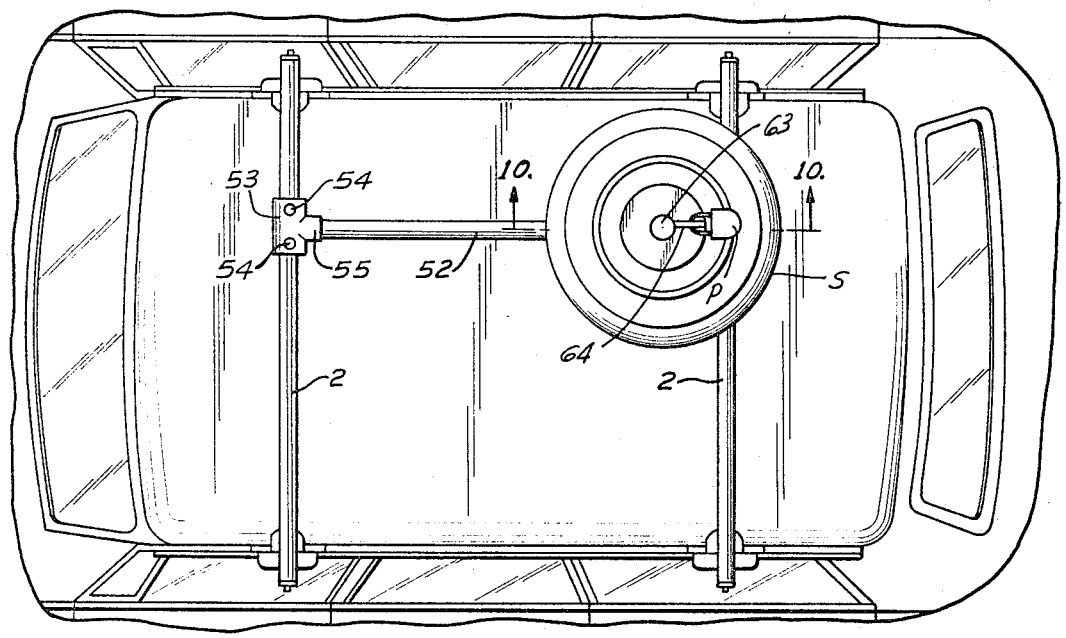
Fig. 8.
Fig. 9.
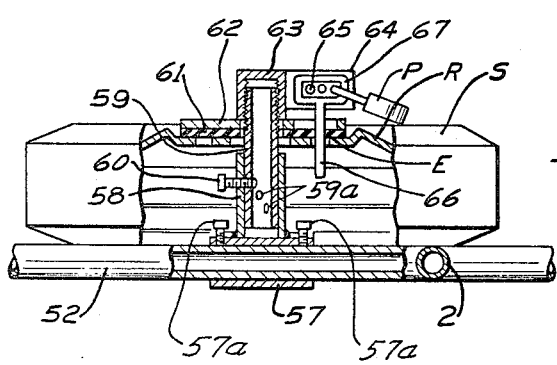
Fig. 10.
INVENTOR.
CHARLES E. WICKETT
BY
John H. Leonard,
his ATTORNEY.

United States Patent Office 3,381,866
Patented May 7, 1968

3,381,866
DETACHABLE LUGGAGE RACK
Charles E. Wickett, 1274 Twinsburg Road,
Macedonia, Ohio 44506
Filed Dec. 1, 1966, Ser. No. 598,274
6 Claims. (Cl. 224—42.1)

ABSTRACT OF THE DISCLOSURE

The preferred embodiment of the luggage rack of the present invention comprises a forward unit and a rearward unit, each in the form of a cross bar rigidly supported at its opposite ends on supports which are clamped in weight transmitting relation to the drain troughs on an automobile top. The rack is characterized principally by the means for clamping the supports to the troughs so that the supports are drawn tightly in place in selected positions and reinforced against deflection or sway laterally of the top; by the provision of lateral baggage retainers which can be slid onto and off of the cross bars over the ends thereof while the cross bars remain installed on the top, and can be secured in adjusted position both axially and circumferentially of the cross bars for snugly and firmly securing the luggage against lateral displacement; a tie bar extending fore and aft of the automobile and having supporting collars which can be slid onto and off of the cross bars over the ends thereof while the cross bars remain installed on the automobile top, and can be secured firmly in place in any adjusted position axially of the cross bars, and which, when installed, prevent lifting of the tie bar off of the cross bars; and a post device connected to the tie bar and receivable through the central opening of a rim and connectable to cooperable clamping means for securing the rim and its attached tire onto the tie bar and at least one of the cross bars.

---

This invention relates to detachable luggage racks for automobiles and particularly to a detachable luggage rack which may be installed readily in operating position in overlying spaced relation to the top of the automobile body of the type having the usual rain or drip troughs along its lateral margins.

Specifically the invention resides in a luggage rack which may be readily and rigidly secured to the drip troughs of the automobile body top without in any way marring the top or the troughs and without requiring the drilling of any mounting holes in the body or the installation on the body of permanent auxiliary fasteners or other devices. The rack is one which is readily adapted for holding usual rigid luggage trunks and containers or elongated articles and loads such as lumber, water pipe, and the like. It can readily be secured in place with a conventional type of wrench and screw driver, and when secured remains securely in place and does not become loosened due to vibrations caused by wind, road shock, and the like. It is sufficiently rigid so that its parts themselves do not vibrate in the wind. Certain parts are shielded so as to reduce wind noises during high speed operation of the automobile.

It is provided with a readily attachably auxiliary device for the carrying of a spare tire and rim, along with other loads, in overlying spaced relation to the top of the body in such a manner that the tire and rim can be locked securely to the rack with a conventional padlock.

Various specific objects and advantages of the invention will become apparent from the illustrative example wherein reference is made to the drawings, in which:

FIG. 1 is a fragmentary side elevation of an automobile showing a rack, including load retaining side plates, embodying the principles of the present invention attached in operating position thereon;

FIG. 2 is a rear elevation of the structure illustrated in FIG. 1;

FIG. 8 is a top plan view of the automobile and rack illustrated in FIG. 1, and showing the addition of a longitudinal supporting bar and tie connecting the front and rear cross bars together for assistance in supporting extra heavy loads, and showing an auxiliary device for supporting a spare tire and rim;

FIG. 9 is a front elevation of the rack structure, tire supporting device, and part of the automobile body, illustrated in FIG. 8; and FIG. 10 is an enlarged fragmentary front elevation, partly in section, of the rear cross bar of the rack and the spare tire supporting structure, as illustrated in FIGS. 8 and 9.

Figure 5:
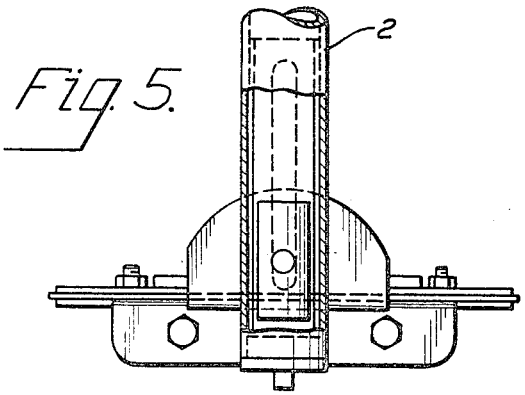
FIG. 5 is a fragmentary top plan view, partly in section, of the structure illustrated in FIG. 3.

Referring to the drawings, the rack of the present invention is mounted on the top of an automobile A having a body B with a hard top H and rain or drip troughs T extending along the lateral margins of the top from a forward position close to the windshield to a rearward portion rearwardly of the rear window, as is customary in most hard top automobile bodies.

A preferred form of rack embodying the present invention is designated generally at 1, and comprises a forward supporting unit and a rearward supporting unit. The units may, or may not, be directly connected to each other. Since they are identical in construction, only the forward unit is described in detail.

The forward unit comprises a load supporting cross bar 2 which preferably is a length of conventional water pipe of about one inch inside diameter and externally plated. The bar is supported in horizontal position and is spaced above the top of the body preferably about six inches. It extends transversely the body at right angles to the length of the body. It is sufficiently long to extend about two to three inches outboard beyond the drip troughs T at the opposite lateral margins of the top H.

Figure 3:
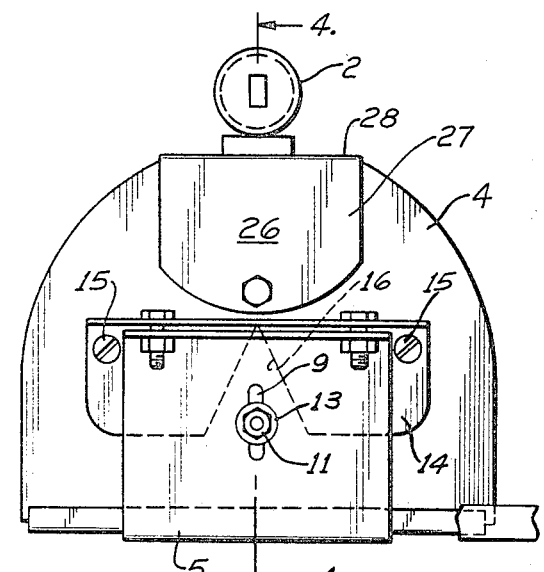
FIG. 3 is an enlarged side elevation showing the forward cross bar of the rack illustrated in FIG. 1, and the supporting structure at one end thereof, the load retaining side plates being omitted for clearness in illustration.
Figure 4:
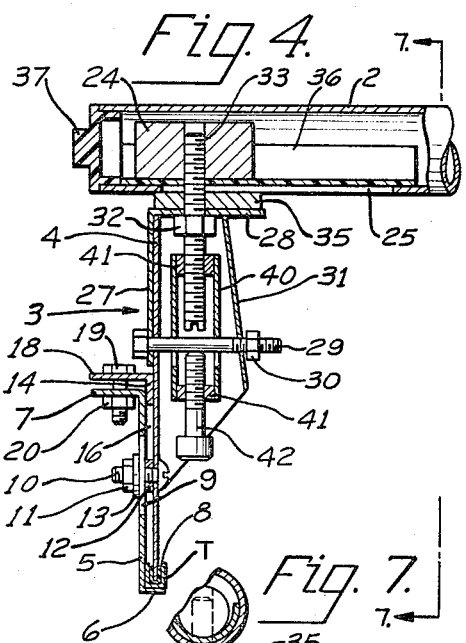
FIG. 4 is an enlarged fragmentary vertical sectional view taken on the line 4—4 of FIG. 3, and showing particularly the parts of the attaching means for attaching the cross bar to the drip trough of the automobile body.
Figure 7:
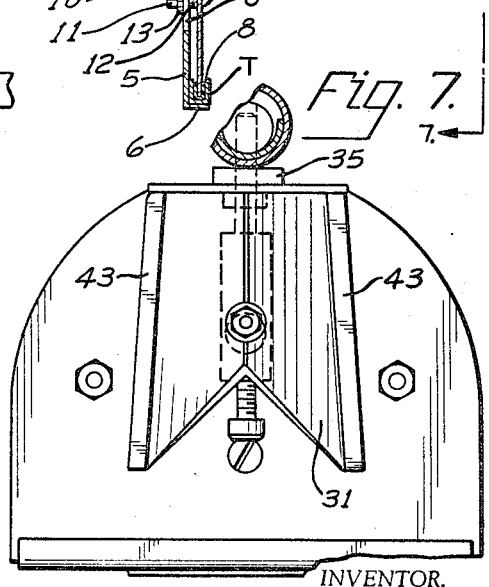
FIG. 7 is an elevation of the inboard side of the structure illustrated in FIG. 3 viewed from the line 7—7 in FIG. 4.
Figure 6:
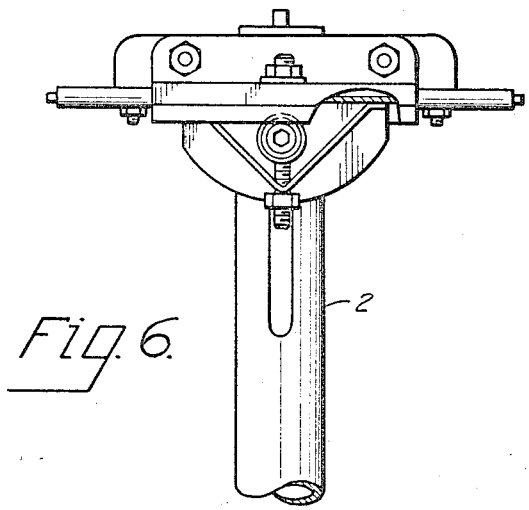
FIG. 6 is a fragmentary bottom plan view, partly in section, of the structure illustrated in FIG. 3.

As best illustrated in FIGS. 3 through 11, the bar 2 is connected near its opposite ends to detachable supports 3, respectively, which are identical in form and function.

Each support 3 comprises a rigid upright supporting plate 4 of sheet metal with a lower edge adapted to be disposed in the drip trough T of the automobile body and rest on the upper inside face of the bottom of the trough. The plate 4 extends upright from the trough and extends edgewise forwardly and rearwardly of the automobile body. In order to clamp the plate 4 in position on the body, a clamping element in the form of a sheet metal plate 5 is provided. At its lower end the plate 5 has an inturned clamping flange 6 extending in the inboard direction relative to the body. At its upper end the plate 5 has an abutment flange 7 extending in the outboard direction relative to the body. The plate 5 is disposed in face to face spaced relation to the plate 4 with the flange 6 underlying the lower edge of the plate 4. The lower margin of the plate 4 is secured in a plastic channel 8 which is adapted to lie within the drip trough T, so as to prevent marring of the trough by the plate 4. The clamping flange 6 of the plate 5 also may be coated, if desired, with plastic for like protection purposes. The plate 4 can be securely mounted in the trough T by disposing the lower edge in the rain trough and then clamping it tightly therein by drawing the plate 5 upwardly and securing the latter in position. To provide for movement of the plate 5 upwardly and for securing it in clamping position, the plate 5 is provided with an upright slot 9. A bolt 10 extends through an aperture in the plate 4, aligned with the slot, and at its outer end is provided with a nut 11 by which the plate 5 may be clamped firmly into the position in which adjusted vertically, this portion being such that the bottom wall of the trough is clamped firmly between the flange 6 and the lower edge of the plate 4.

An inboard lock nut 12 is secured on the bolt 10 between the plates 4 and 5 and is drawn tightly against the plate A. This nut acts as a spacer and abutment against which the plate 5 can be drawn firmly by the nut 11. A washer 13 may be interposed between the nut 11 and plate 5.

For drawing the plate 5 vertically into tight clamping relation to the bottom of the trough T preparatory to tightening the nut 12, a rigid draw plate 14 is provided. The plate 14 is securely fastened by stove bolts 15 in fixed face to face relation to the plate 4. The plate 14 has a notch 16 so as to clear the bolt 10. The lock nut 13 and plate 14 are preferably of the same thickness so that they bridge the space between the plates 4 and 5.

For moving the plate 5 vertically prior to locking it by means of the nut 12 and bolt 10, the plate 14 is provided with an outboard flange 18 spaced above and aligned with the flange 7 of the plate 5. Near their ends the flanges 7 and 18 are provided with aligned apertures through which extend bolts 19 carrying nuts 20. By tightening the nuts 20, the plate 5 can be drawn upwardly so that the flange 6 tightly engages the underside of the drip trough T. The plate 14 thus provides shoulder means against which the manually operable means bear when moving the clamping plate to clamping position.

In order to connect the cross bar 2 for adjustment axially, a rigid clamping block 24 is disposed in the hollow cross bar 2 and is movable axially thereof. The cross bar 2 is provided with a longitudinally extending slot 25 which begins near the outboard end of the bar and extends a few inches inwardly. A supporting plate 26 having an upright portion 27 in face to face juxtaposition with the outboard face of the plate 4 and having at its upper edge a horizontal flange 28 extending in the inboard direction, is provided. The plate 26 is disposed so that the top edge of the plate 4 engages the underside of the flange 28. The plates 26 and 4 are secured together by means of a tie bolt 29 and nut 30 in cooperation with a reinforcing and protective shield 31, later to be described. The plate 26 is held firmly in fixed position relative to the plate 4 by means of the bolt 29 and is constrained from rocking forwardly and rearwardly by engagement of the flange 27 and upper edge of the plate 4.

Disposed against the underside of the flange 28 is a nut 32 which accommodates a threaded bolt or screw 33. The bolt 33 extends upwardly through an aligned aperture in the flange 28, through the slot 25 in the cross bar 2, into threaded engagement with the lug or block 24 within the cross bar 2. One or more suitable spacing washers 35 may be disposed between the flange 28 and the underside of the cross bar 2 for spacing the bar at the height desired above the flange 28. The nut 32 cooperates with the bolt 33, block 24, and flange 28 to clamp the cross bar firmly against the flange. To prevent wind noises due to the slot 25 and also to shield the inside of the bar 2 and parts therein against weather, a suitable plastic or vinyl sheet 36 is disposed within the cross bar 2 in partially surrounding relation to the block 24 and in closing relation to the slot 25, and a plastic cap 37 is press-fitted into the outboard end of the cross bar 2. A tie element 40, in the form of a tube having solid end walls 41, is provided. The end walls have internally threaded apertures. The upper wall 41 is in threaded engagement with the bolt 33. The lower wall 41 is in threaded engagement with a bolt 42. The element 40 may be screwed to the desired adjusted height, even to a height to act as a lock nut for the nut 32. The element 40 is provided with a plurality of pairs of transversely aligned apertures large enough to afford passage of the bolt 29 transversely therethrough at selected locations lengthwise between the ends of the element 40 with substantial radial clearance between the bolt and aperture walls. The bolt 42 is arranged so that it can be screwed inwardly and into forced engagement with the transverse bolt 29, thus resisting rotation of the bolt 29 and also exerting a downward force on the element 40 tending to pull the flange 28 firmly against the upper edge of the plate 4.

As mentioned, a reinforcing and stiffening weather shield 31 is provided. The shield 31 is of sheet metal bent to generally V-shape or channel shape section. The shield is disposed endwise in upright position and is open at the ends. Its sidewalls, at the open side of the shield, have out turned flanges 43 which are juxtaposed against the inboard face of the plate 4. The upper open end of the shield 31 is juxtaposed against the underside of the flange 28 of the plate 26. At its crest, or intersection of its sidewalls, the shield 31 is provided with an aperture through which the bolt 29 extends so that, by tightening the nut 30, the shield 31 can be drawn firmly into the reinforcing and stiffening position, and also act as a weather shield of the parts enclosed by the shield and plate 4 therebeneath. In this position, the bolt 42 can be tightened, thereby forcing the upper end of the shield 31 tightly against the underside of the flange 28. Thus the cross bar can be held firmly in place at the adjusted height desired. It is apparent that with this structure, the upright supporting parts of the luggage rack can be firmly clamped in position on the trough T, and the bar 2 itself can be adjusted endwise relative thereto to compensate for variations in the width of the body tops between opposite drip troughs.

A rigid container 44, such as is usually provided for luggage, is supported on the cross bars 2, as indicated by the dot and dash lines in FIGS. 1 and 2. For holding the container 44 in fixed position transversely of the cross bars, lateral load retaining devices 45 are provided. Each device 45 comprises an upright sheet metal member or retaining plate 46 secured at its bottom edge to a retainer collar member 47 which may be a length of pipe of proper internal diameter to telescopically receive and accommodate the cross bar 2. A portion of the peripheral wall of the collar member 47 is ground or cut away to provide at the bottom of the collar member a slot 48 so that the member 47 may be slid onto the cross bar 2 from the outer end past bolt 33 and clear of the washer 35 to the desired position axially of the bar 2. Suitable set screws 49 are carried by the collar member 47 for securing it in the proper axial position along the bar 2 and in proper rotated position about the axis of the bar 2 for the most effective engagement with the container 44 or load to be carried. For reinforcing the retaining plate 46, a reinforcing rod 50 is connected at its upper end to the plate 46 near the upper end of the plate 46 and is connected at its lower end, by welding or the like, to the collar member 47.

In order to facilitate the lashing of a luggage container or other load on the rack, the cross bars 2 are made longer than the distance between the troughs T so that they extend in the outboard direction two or three inches beyond the plates 4 at each end so that a rope or the like can be fastened thereabout. Also, an eyelet is welded onto each of the rods 50. The eyelet may be in the form of a chain link 51 positioned so that a rope or suitable flexible tie member can be passed therethrough for facilitating the typing of the luggage container or load in position on the rack.

As mentioned, in many instances it is desirable to connect the front and rear tie bars 2 together. In fact, it may be that in the case of station wagons, three or four cross bars 2 may be used and tied together. In the form illustrated, only a front and a rear cross bar 2 are provided. If they are to be directly connected together, a suitable connecting rod 52 is provided. The rod 52 may be a length of pipe having its ends accommodated in connectors 53 which are telescopically received on the cross bars 2. These connectors 53 may be essentially the same as the collars 47 heretofore described. Each connector is provided with a suitable set screw 54 for securing it in adjusted position axially of the cross bar 2. Each connector 53 is provided with a lateral extending collar 55 in which the adjacent ends of the tie rod 52 are received. If desired, the collars 55 may be internally threaded and the rod or pipe 52 externally threaded for securing them firmly together so as to connect the front and rear cross bars 2 directly together and resist separation thereof endwise of the body top. One or more of rods 52 may be provided, depending upon the weight and shape of the load to be carried, but generally one is sufficient. Such a rod 52 also makes possible the convenient and stable support of spare tires and rims on the rack. For example, for securing a tire in place while resting on a cross bar 2 and rod 52, as illustrated in FIGS. 8 through 10, a sleeve 57 is telescopically accommodated on the rod 52 and carries a lateral supporting sleeve 58 which preferably is arranged with its axis at a right angle to the sleeve 57. The sleeve 57 is provided with suitable set screws 57a by which it can be secured in any desired position along the rod 52 and in any rotated position about the axis of the rod 52, but usually with the sleeve 58 in an upright position. Telescopically received in the sleeve 58 for adjustment endwise is a post 59 which may be in the form of a length of pipe threaded at the top. A set screw 60 is carried by the sleeve 58 in a position for holding the post 59 in the properly adjusted position axially. The lower end of the post may be threaded into the sleeve 58 if desired, or may have a plurality of adjustment apertures 59a arranged in a helical row for receiving the inner end of the screw 60. The post 59 is adjusted to extend upwardly through the central opening of the detachable rim R of a spare automobile tire S, when the underside of the tire rests on the rod 52 and cross bar 2, thus providing a three point support for the tire and rim. Since the tire itself engages the bar 2 and rod 52, no noise can be caused by engagement of the rim and support. To eliminate contact between the rim and the locking means therefor, a suitable gasket 61 is provided and juxtaposed against the upwardly facing central portion of the rim, and a clamping plate 62 is juxtaposed on the top face of the gasket, the gasket and plate having a central aperture through which the post 59 extends. The post 59 is threaded at its upper end and receives a clamping nut 63 which preferably is in the form of an internally threaded cap. The nut 63 is so arranged that it can be screwed downwardly and bear firmly against the plate 62 and force the rim downwardly so as to hold the tire firmly against the cross bar 2 and the rod 52. The nut 63 has a laterally extending finger 64 with a row of apertures 65 therein.

The gasket 61 and plate 62 have alignable slots extending therethrough. A locking pin 66 is passed through the aligned slots in the gasket 61 and plate 62 and through one of the bolt holes, indicated at E, customarily provided in detachable rims for receiving bolts for connecting the rim to the hub of a wheel. The pin 66 is provided at its upper end with an eyelet 67 which may be aligned with one of the apertures 65 in the finger 64 so that the hasp of a padlock P can be passed through the eyelet 67 and aligned with one of the apertures 65 for preventing removal of the pin from the bolt hole in the tire rim. With the pin thus installed and locked, the nut or cap 63 cannot be rotated and removed. The set screw 60, of course, is shielded by the rim and tire, the plates 62 and gasket 61 thereabove, so that it is inaccessible. The spare tire may be carried off center laterally of the rack, if so desired, so as to leave adequate space to carry an additional load at one side or the other of the tire.

It is apparent from the foregoing description that the present luggage rack is one which can readily be detached and removed from the top of an automobile body without in any way interfering with the body and without requiring any permanently attached auxiliary fixtures on, or holes in, the body or any part thereof. Furthermore, the rack is readily adjustable to fit bodies of different sizes and shapes, and to firmly position and support luggage and other loads in spaced relation above the top of the body, to engage and confine a load laterally for holding it against shifting and also to facilitate tying of the load securely in position. The rack is readily adjustable lengthwise for fitting bodies of different lengths and for different lengths of luggage or load. The lateral retaining plates not only are adjustable laterally for preventing laterally shifting of loads smaller than the normal full width of the rack, but also they can be swung downwardly out of the way if extra wide or odd shaped loads are to be supported.

Furthermore, the rack itself can be suitably reinforced by longitudinal tie rods to any extent necessary, depending upon the load.

The rack is so arranged so as to be substantially free from noises due to the rubbing and banging of one piece of metal against another, inasmuch as all parts are firmly clamped to prevent any relative movement therebetween.

As a result of the adjustments provided, compensation can be made for dimensional and other errors in a body and as a result of which the theoretical symmetry of corresponding parts of the body is lacking, so that the rack can be fitted securely to the body despite such errors.

Having thus described my invention, I claim:

1. A detachable luggage rack for an automobile body top having longitudinally extending, upwardly open drip troughs along its lateral margins, respectively, said rack comprising a forward load supporting unit and a rearward load supporting unit, and each unit including the following:
   (a) a pair of rigid supports each having one end arranged for reception in weight transmitting relation in an associated one of the troughs;
   (b) clamping elements movably connected to the supports, respectively, each element having a portion arranged for engagement with the underside of the trough associated with its associated support for clamping its associated support thereto in preselected positions along the associated trough;
   (c) means for securing the clamping elements fixedly in clamping positions, respectively;
   (d) a rigid cross bar, and
   (e) connecting means interconnecting the opposite ends of the cross bar to the supports, respectively, in preselected adjusted positions endwise of the cross bar, characterized in that each support is a rigid support plate, the clamping means for each support plate is a clamp plate in face to face relation to the support plate, a fixed draw plate is secured to the support plate and has an out-turned flange;

the associated clamp plate has an out-turned flange aligned with said first mentioned out-turned flange in the direction of the path of movement of the clamp plate to clamping position;

said flanges have aligned apertures therein; and a bolt extends through the aligned apertures and bears against one out-turned flange and companion threaded means are connected to the bolt and bear against the other out-turned flange, for driving the plates to clamping position.

2. A detachable luggage rack for an automobile body top having longitudinally extending, upwardly open drip troughs along its lateral margins, respectively, said rack comprising a forward load supporting unit and a rearward load supporting unit, each unit including the following:

a pair of rigid supports each having one end arranged for reception in weight transmitting relation in an associated one of the troughs;

clamping elements movably connected to the supports, respectively, each element having a portion arranged for engagement with the underside of the trough associated with its associated support for clamping its associated support thereto in preselected positions along the associated trough;

means for securing the clamping elements fixedly in clamping positions, respectively;

a rigid cross bar;

connecting means interconnecting the opposite end portions of the cross bar to the supports, respectively, in preselected adjusted positions endwise of the cross bar, characterized in that the connecting means for each end of the cross bar comprise:

a threaded bolt connected to the cross bar and extending therefrom alongside the support;

rigid means carried by the support and having a portion interposed between the cross bar and adjacent end of the support and in fixed position relative to the support and having an aperture, said bolt extending through said aperture, a nut on said bolt for clamping said last mentioned portion in fixed position relative to the cross bar;

a tie element in threaded engagement at one of its ends with the bolt and having a passage therethrough extending transversely of the bolt and intersecting the axis thereof;

a reinforcing shield of channel shape and having the sides of the channel at the free margins juxtaposed against the support, said channel extending endwise of the threaded bolt and having one of its ends adjacent the cross bar in engagement with the connecting means, and having an aperture aligned with the transverse passage of the tie element;

a rigid threaded member connected to the support and extending through said transverse passage and aperture of the shield, and a nut member cooperable with the rigid threaded member for drawing the shield firmly against the support.

3. The structure according to claim 2 wherein a stress bolt is in threaded engagement with the tie element at the opposite end of the tie element and extends toward and, at its inner end, is in stressed engagement with the rigid member.

4. A detachable luggage rack for an automobile body top having longitudinally extending, upwardly open drip troughs along its lateral margins, respectively, said rack comprising a forward load supporting unit and a rearward load supporting unit, and each unit including the following:

a pair of rigid supports each having one end arranged for reception in weight transmitting relation in an associated one of the troughs;

clamping elements movably connected to the supports, respectively, each element having a portion arranged for engagement with the underside of the trough associated with its associated support for clamping its associated support thereto in preselected positions along the associated trough;

means for securing the clamping elements fixedly in clamping positions, respectively;

a rigid cross bar;

connecting means interconnecting the opposite ends of the cross bar to the supports, respectively, in preselected adjusted positions endwise of the cross bar, characterized in that:

retaining plate collars are provided and are telescopically received on, and in coaxial relation to, at least one of the cross bars over the ends thereof while said one of the bars is supported by its supports, and are movable endwise of said one bar and are rotatable about the axis thereof to different adjusted positions;

means are provided on the collars, respectively, for securing them in selected adjusted positions on said bar; and retainer plates are mounted in fixed position on the collars, respectively, and extend radially thereof and have inboard retaining faces facing endwise of said cross bar.

5. A detachable luggage rack for an automobile body top having longitudinally extending, upwardly open drip troughs along its lateral margins, respectively, said rack comprising a forward load supporting unit and a rearward load supporting unit, and each unit including the following:

a pair of rigid supports each having one end arranged for reception in weight transmitting relation in an associated one of the troughs;

clamping elements movably connected to the supports, respectively, each element having a portion arranged for engagement with the underside of the trough associated with its associated support for clamping its associated support thereto in preselected positions along the associated trough;

means for securing the clamping elements fixedly in clamping positions, respectively;

a rigid cross bar;

connecting means interconnecting the opposite ends of the cross bar to the supports, respectively, in preselected adjusted positions endwise of the cross bar, characterized in that:

a load supporting tie bar is provided and extends from the forward cross bar to the rearward cross bar;

rigid connector collars are mounted on the ends of the tie bar, respectively, and accommodate the cross bars for relative movement of the connector collars axially of the cross bars and off of the ends thereof while the cross bars remain attached to their supports, said collars extend more than half-way around the cross bars so that they are constrained from removal from the cross bars radially of the cross bars; and means are provided for connecting the collars in fixed position axially of the cross bars, respectively.

6. The structure according to claim 5 wherein a post is rigidly connected to the tie bar and extends upwardly therefrom and is arranged to be received through the central opening of a detachable rim while a side face of the tire rests on the tie bar and one of the cross bars;

connector means are detachably connected to the post and are operative to engage the rim and hold the tie bar and rim fixedly in position; and means to lock the connector means in connecting position.

References Cited

UNITED STATES PATENTS

| | | | |
|---|---|---|---|
| 2,671,583 | 3/1954 | Shaw | 224—42.1 |
| 2,783,367 | 2/1957 | Locke. | |
| 3,132,780 | 5/1964 | Binding | 224—42.1 |
| 3,181,753 | 5/1965 | Fitch. | |
| 3,261,520 | 7/1966 | Andersson | 224—42.1 |
| 3,281,030 | 10/1966 | Gosswiller | 224—42.1 |
| 3,282,484 | 11/1966 | Jerore | 224—42.1 |

FOREIGN PATENTS 1,333,369  6/1963  France.

GERALD M. FORLENZA, *Primary Examiner.*

R. BALLANTYNE, *Assistant Examiner.*